US011400989B2

(12) United States Patent
Sørensen

(10) Patent No.: US 11,400,989 B2
(45) Date of Patent: Aug. 2, 2022

(54) BICYCLE PARKING STAND FOR LOCKING A BICYCLE TO THE STAND COMPRISING AN ELECTRONIC LOCK

(71) Applicant: JFS PATENTS APS, Koege (DK)

(72) Inventor: Jesper Farver Sørensen, Koege (DK)

(73) Assignee: JFS PATENTS APS, Koege (DK)

( * ) Notice: Subject to any disclaimer, the term of this patent is extended or adjusted under 35 U.S.C. 154(b) by 0 days.

(21) Appl. No.: 17/428,896

(22) PCT Filed: Jan. 28, 2020

(86) PCT No.: PCT/DK2020/050024
§ 371 (c)(1),
(2) Date: Aug. 5, 2021

(87) PCT Pub. No.: WO2020/160736
PCT Pub. Date: Aug. 13, 2020

(65) Prior Publication Data
US 2022/0073159 A1 Mar. 10, 2022

(30) Foreign Application Priority Data
Feb. 5, 2019 (DK) .......................... PA 2019 00163

(51) Int. Cl.
*B62H 3/10* (2006.01)
*B62H 5/10* (2006.01)
*B62H 5/20* (2006.01)

(52) U.S. Cl.
CPC .............. *B62H 3/10* (2013.01); *B62H 5/10* (2013.01); *B62H 5/20* (2013.01); *B62H 2700/005* (2013.01)

(58) Field of Classification Search
CPC ..... E05B 71/00; B62H 1/08; B62H 2003/005; B62H 3/00; B62H 3/04; B62H 3/10; B62H 2700/005; B62H 5/10; B62H 5/20
(Continued)

(56) References Cited

U.S. PATENT DOCUMENTS 4,245,745 A * 1/1981 Verelle ................. A63C 11/007
211/8
5,244,101 A 9/1993 Palmer et al.
(Continued)

FOREIGN PATENT DOCUMENTS

GB 2460062 A 11/2009
GB 2544736 A 5/2017
(Continued)

OTHER PUBLICATIONS

International Search Report issued in connection with PCT Application No. PCT/DK2020/050024 dated Apr. 2, 2020.

*Primary Examiner* — Patrick D Hawn
(74) *Attorney, Agent, or Firm* — Steven M. Shape; Dennemeyer & Associates, LLC

(57) ABSTRACT

Present invention relates to a bicycle parking stand (1) for locking a bicycle to the stand (1). It comprises a bottom section (A) with a top section (B) fixed on top, a gate (E) hinged to bottom section (A) and top section (B) and an electronic unit (G) fixed inside top section (B). Electronic unit (G) comprises an electronic lock (H) with a latch (P) and a printed circuitry board (I) with an antenna placed underneath window (J) enabling operation of stand (1) by an electronic device. Stand (1) further comprises clamping means for releasable clamping a crankarm (V) to the clamping means. Gate (E) adapted to move from an open to a closed position where striker-plate (F) fixed to gate (E) engages latch (P) of the electronic lock (H) thereby preventing gate (E) from opening and the bicycle pulled out of the clamping means.

15 Claims, 19 Drawing Sheets

(58) Field of Classification Search
USPC .............................................. 211/22, 24, 70.5
See application file for complete search history.

(56) References Cited

U.S. PATENT DOCUMENTS

| | | | | |
|---|---|---|---|---|
| 5,278,538 | A | * | 1/1994 | Ainsworth ......... G07C 9/00722 340/432 |
| 5,323,915 | A | * | 6/1994 | Fortune, Sr ............. E05B 71/00 211/5 |
| 8,061,499 | B2 | * | 11/2011 | Khairallah ............... B62H 3/02 340/432 |
| 9,840,855 | B2 | * | 12/2017 | Lin .......................... B62H 3/10 |
| 10,641,014 | B2 | * | 5/2020 | Tepper ...................... G07C 9/33 |
| 2006/0169423 | A1 | * | 8/2006 | Chuang ................... B62H 3/00 160/180 |
| 2009/0178446 | A1 | * | 7/2009 | Patterson ............... B62H 5/144 70/259 |
| 2010/0089846 | A1 | * | 4/2010 | Navarro Ruiz ....... H02J 7/0027 320/109 |
| 2010/0178140 | A1 | * | 7/2010 | Chang ...................... B62H 3/08 414/228 |
| 2015/0096335 | A1 | | 4/2015 | Haidak et al. |
| 2017/0036721 | A1 | * | 2/2017 | Rinne ...................... B62H 3/00 |
| 2017/0306656 | A1 | | 10/2017 | Lin |

FOREIGN PATENT DOCUMENTS

| | | | | |
|---|---|---|---|---|
| WO | | 2015162339 A1 | 10/2015 | |
| WO | WO-2018111098 A1 | * | 6/2018 | ............... B62H 5/10 |
| WO | WO-2021028128 A1 | * | 2/2021 | ............... B62H 3/10 |

* cited by examiner a)

b)

"Bikeep" by company DesignBoom

BICYCLE PARKING STAND FOR LOCKING A BICYCLE TO THE STAND COMPRISING AN ELECTRONIC LOCK

CROSS-REFERENCE TO RELATED APPLICATIONS

This is a 35 U.S.C. 371 National Stage Patent Application of International Application No. PCT/DK2020/050024, filed Jan. 28, 2020, which claims priority to Denmark application PA 2019 00163, filed Feb. 5, 2019, each of which is hereby incorporated by reference in its entirety.

FIELD OF THE INVENTION

A bicycle parking stand for locking a bicycle to the stand comprising:
a bottom section directly or through a base affixed to the ground or pavement, said bottom section comprises a right vertical side wall, an opposite placed vertical left side wall and a back-wall.

BACKGROUND OF THE INVENTION

Prior art bicycle stands have 3 major disadvantages. First one being bicycle theft because of chain, wire and U-locks not capable to withstand a bolt cutter. Second disadvantage is the inconvenience of having to bring a heavy and costly chain, wire or U-lock. Third major disadvantage is potential damage of the bicycle, especially damage of the front wheel and scratches of the frame.

Damage of the front wheel is related to the far dominant prior art stand, which supports the bicycle by its front wheel. FIG. 1 shows 3 embodiments of this type and the damage happens if the bicycle is pushed over by the wind or a fellow cyclist. A bicycle is in these types of stands either locked to the stand by an external lock e.g. a chain, wire or U-lock brought by the cyclist, or the stand is only used as leaning support and bicycles are individually locked by the integrated lock or an external lock.

FIG. 2 illustrates 2 embodiments of leaning stands where the bicycle is leaned against the stand. Most embodiments aren't fitted with an integrated locking device, which is why the bicycle is locked either to the stand by an external lock, or the bicycle is individually locked by the integrated lock or an external lock. Embodiments with an integrated locking device, is most often a metal wire which is wrapped around the bicycle and locked with the integrated lock of the bicycle or an external lock. These locking methods are subject to theft with a bolt cutter, and there is as well a high risk that the bicycle is scratched since most embodiments are plain metal.

FIG. 3 illustrates one embodiment of a bicycle stand that entraps the bicycle. Global population of this type of stand is low and present innovation represents a new embodiment of this type.

The far majority of prior art bicycle stands are the embodiments illustrated in FIG. 1 and FIG. 2 and the common problems for these are bicycle theft and the inconvenience of the cyclist having to bring a chain, wire or U-lock in order to lock the bicycle to the stand. Majority of the locks sold can't withstand a bolt cutter, and those that can, are expensive, big and heavy.

This is the reason why millions of bicycles are stolen from bicycle stands every year and it is an established fact that bicycle theft is a key reason why a lot of people refrain from using their bicycle for daily transportation. Seen in a wider perspective bicycle theft is thereby negatively affecting the environment, the general health of the public and adds to the increasing problems of traffic jams in the cities.

For these reasons, cyclists, and society in general, will benefit from a bicycle stand where bicycle can be parked without having to bring an external lock. A stand that further offers leaning support that doesn't damage the bicycle, and from which the bicycle can only be stolen by a severe, noisy and time-consuming metal cutting process. Present invention presented in FIG. 4 through FIG. 19 offers these advantages and is furthermore easy and intuitive to use.

The prior art stand coming closest to present invention is described in U.S. Pat. No. 5,244,101A. The stand described in U.S. Pat. No. 5,244,101A also comprises a pole and gate which entraps the bicycle crankarm. Major difference to present invention is that crankarm in U.S. Pat. No. 5,244,101A must be lowered into the stand from above and that the crankarm-slot doesn't have spring effect and rubber fenders ensuring the bicycle doesn't get scratched. Another advantage of present invention in comparison to U.S. Pat. No. 5,244,101A is the more user-friendly electronic locking interface.

Other prior art stands to mention is described in EP0147384 and US2015096335. The stand described in EP0147384 offers leaning support but doesn't have spring effect of the crankarm-slot whereby the stability of the bicycle isn't as good as present invention. Secondly, it doesn't offer the same level of theft protection and user convenience. Locking system of EP0147384 is based on an external lock (chain, wire or U-lock) with the related risk of theft and secondly the cost and inconvenience of having to bring such a locking device.

Locking process of EP0147384 is as well rather inconvenient because of the complexity and low position of the locking process. In a direct comparison with EP0147384, present invention offers a much more convenient and theft proof parking of the bicycle through the simple registration of an electronic device, and the bolt cutter proof design.

FIG. 3 illustrates US2015096335 which is a leaning type stand with a rotational metal bar that entraps the bicycle frame and front wheel. US2015096335 features like present invention an advanced electronic locking system, that can be operated by e.g. a smartphone. US2015096335 has 2 immediate disadvantages. First one being that bicycle is leaned against the metal pole of the stand or the metal bar, whereby there is a risk that the bicycle gets scratched. Second disadvantage is the fact that the locking metal bar must come through the front wheel, why the cyclist in many cases has to turn the front wheel to avoid the metal bar hitting a spoke. And some bicycles even have support of the mudguard in the area where the metal bar comes through the wheel, which is why they can't be locked to the stand without bending the support.

BRIEF DESCRIPTION OF THE INVENTION

Present invention relates to an electronic bicycle parking stand. It is the primary objective to deliver a bicycle stand where the cyclist does not have to use an external lock like a chain, wire or U-lock. It is another important objective to deliver a bicycle stand where professional power cutting tools, and not only a bolt cutter, is needed to steal the bicycle from the stand. It is a third objective to deliver a bicycle stand with leaning support of the bicycle that does not damage the bicycle in any way.

It is a fourth objective to deliver a bicycle stand that is easy and intuitive to use enabling the cyclist to park the bicycle fast and conveniently. Finally, it is another objective to provide a low cost and minimalist design with minimum installation costs.

According to the invention a bicycle park stand is provided as per the introductory part of this specification and wherein the bicycle parking stand further comprising a top section fixed on top of said bottom section, said top section comprising the vertical left side wall, the back wall, a right vertical wall and a front wall, the stand further comprises a gate hinged to the joined top section and bottom section by hinges, and an electronic unit fixed inside the top section, said electronic unit comprises an electronic lock with a latch and a printed circuitry board containing electronics, the stand further comprises clamping means for releasable clamping a crankarm of the bicycle to said clamping means, and the gate is adapted to move from an open position to a closed position and a striker-plate placed on the gate engages the latch of the electronic lock thereby preventing that said gate can be opened and the bicycle pulled out of the clamping means when the electronic lock is activated.

The top section might be at tube or a plate designed and placed on the top of the bottom section. The two parts might be two separate parts joined by welding for instance or they may be constructed as one part.

Release of the bike after parking is the reverse of the locking process. User re-registers his or her electronic device whereby electronic lock opens and allows gate to be turned away from blocking crankarm-slot whereby bicycle can be pulled out from the stand.

The full locking and unlocking process are easy and convenient and can be carried out with user keeping hands on cycle handlebar and personal electronic device only. The only operation of the stand needed is to open and close the gate, which can be done with a simple push by foot. And by developing and offering an application for user electronic device, locking and unlocking process can be made easy and intuitive.

Stand being connected to the internet enables central and remote control of the stand by a facility management. This provides facility management 2 key advantages. First, one being easy removal of abandoned bicycles, which represents a huge challenge in prior art stands where bicycles are locked with user personal lock. Second being that it enables facility management to offer a 'reserve, park and pay' service, where users can book a stand and pay a fee for this service. In that way present invention offers a new business model compared to prior art bicycle stands.

With the gate in closed mode the stand encloses the crankarm and the pedal thereby preventing that the bolt fixing of the crankarm to the bicycle and the bolt fixing of the bicycle pedal to the bicycle crankarm can be accessed.

A user registers as the rightful owner of the bicycle by placing his or her electronic device above a window whereby electronic device communicates with the printed circuitry board with its intertied antenna.

The electronic unit may be supplied with power externally by a wire or a battery as an integrated part of the device. The bottom section may comprise a wire guard fixed to the inside corner of the left wall and back wall.

According to one embodiment, the top section further comprises a window, and that the locking/unlocking of the bicycle is adapted to take place by placing an electronic device above the window whereby the electronic device communicates with the printed circuit board and its intertied antenna whereby the locking/unlocking takes place.

The window is preferably placed at the top of the top section but may also be placed at a side of the top section. It is just important that it is possible to communicate with the electronic device. The window preferably comprises a transparent but still impact proof material such as e.g. safety glass or acrylic glass. Reason why transparency is preferable is the possibility to use LED(s) to indicate locking status of the stand to a user.

According to one embodiment, the clamping means comprises a fender placed on/integrated with a wall section attached to the bottom section and being horizontally flexible said fender forms together with a second fender placed at the inside of one side wall situated across of it the clamping means being a flexible crankarm-slot and the bicycle crankarm is adapted to be pushed into said crankarm-slot causing a clamping force upon crankarm keeping the bicycle in upright position.

The wall section is placed opposite the second fender.

A forward rolling direction of the bicycle with bicycle crankarm is in its lowest vertical position. The flexible wall section with the fender and the second fender of said opposite wall is flexing when the bicycle crankarm is inserted causing a clamping force upon the bicycle crankarm keeping the bicycle in an upright position, without additional leaning support and without damaging or scratching the bicycle. The fender on the wall opposite to the flexible wall is situated at the top of the wall and height of the wall is so that the crank of the bike can pass above it, According to one embodiment, the printed circuitry board with its intertied antenna is positioned just below a window allowing users electronic device to communicate with wireless communication such as Near Field Communication and Bluetooth modules of said circuitry board.

The printed circuitry board is preferably placed in the top of said of electronic unit.

According to one embodiment, it further comprises a lever attached to the flexible wall section said lever is adapted to activate a switch in the electronic unit when a bicycle is inserted, this ensures that a stand cannot be locked and reserved without a bicycle inserted.

According to one embodiment, the electronic unit further comprises a signal device such as LED(s) or an acoustic device adapted to indicate locking status of the stand to a user.

According to one embodiment, the printed circuitry board further comprises a microphone, speaker and SW solution adapted to detect vandalism and set off an acoustic alarm and/or send an alarm to facility management.

According to one embodiment, a power unit is integrated in the lock. The power unit may be a battery and it may further comprise a solar panel to minimize the need for external power supply.

According to one embodiment, a user registration with his or her electronic device takes place at a reader situated on a remote pole away from the individual stand.

According to one embodiment, the striker-plate of the gate is adapted to push the latch during locking of the bicycle to the stand whereby the latch is adapted to rotate.

The latch rotates around its axis fixed in the electronic lock due to the push. This rotation of the latch has two consequences. The first one being that the latch entraps the striker-plate whereby the gate can't be opened, and the bicycle cannot be pulled out of the clamping means. The second consequence is that the latch is locked in the rotated position by a locking mechanism inside the electronic lock. This locking mechanism of the latch can be controlled by the users electronic device or facility management only. Therefore, when the user registers his or her electronic device after having closed the gate and thereby locked the latch, it is ensured that only this device or facility management can open the lock.

Release of the bike after parking is the reverse of the locking process. User re-registers his or her electronic device whereby the latch of electronic lock is released allowing gate to be opened and the bicycle pulled out of the clamping means.

According to one embodiment, the bottom section further comprises a fender fixed to wall below the fender thereby sitting at the lower end of bicycle crankarm and limiting how much the bicycle can be tilted towards the stand and be scratched.

According to one embodiment, the stand is connected to the internet either wireless or by wire.

According to one embodiment, all fenders are made in a soft material not scratching the bicycle crankarm.

According to one embodiment, the fenders comprise protrusions acting as end stop for the insertion of the bicycle crankarm.

According to one embodiment, it further comprises electronics and SW for central and remote administration of the stand by a facility manager.

According to one embodiment,

It further comprises an application on user electronic device for operating the stand.

According to one embodiment,

It further comprises SW solution for user to reserve a stand and pay a parking fee to facility manager based on time parked.

According to one embodiment, the height of the stand is less than 45 cm above ground allowing bicycle for left neighbor stand to pass right by with pedal above stand in upper most.

According to one embodiment, the crankarm-slot is open at both front and backside of bottom section with a gate solution blocking both openings. This design allows the bicycle to enter and exit the stand from both front and back side.

According to one embodiment,

The crankarm-slot is oriented in an angle relative to the rolling direction of the bicycle.

According to one embodiment, multiple stands are fixed on a carousel that can be used for an fully automated parking house.

DETAILED DESCRIPTION OF THE INVENTION

Figure 18:
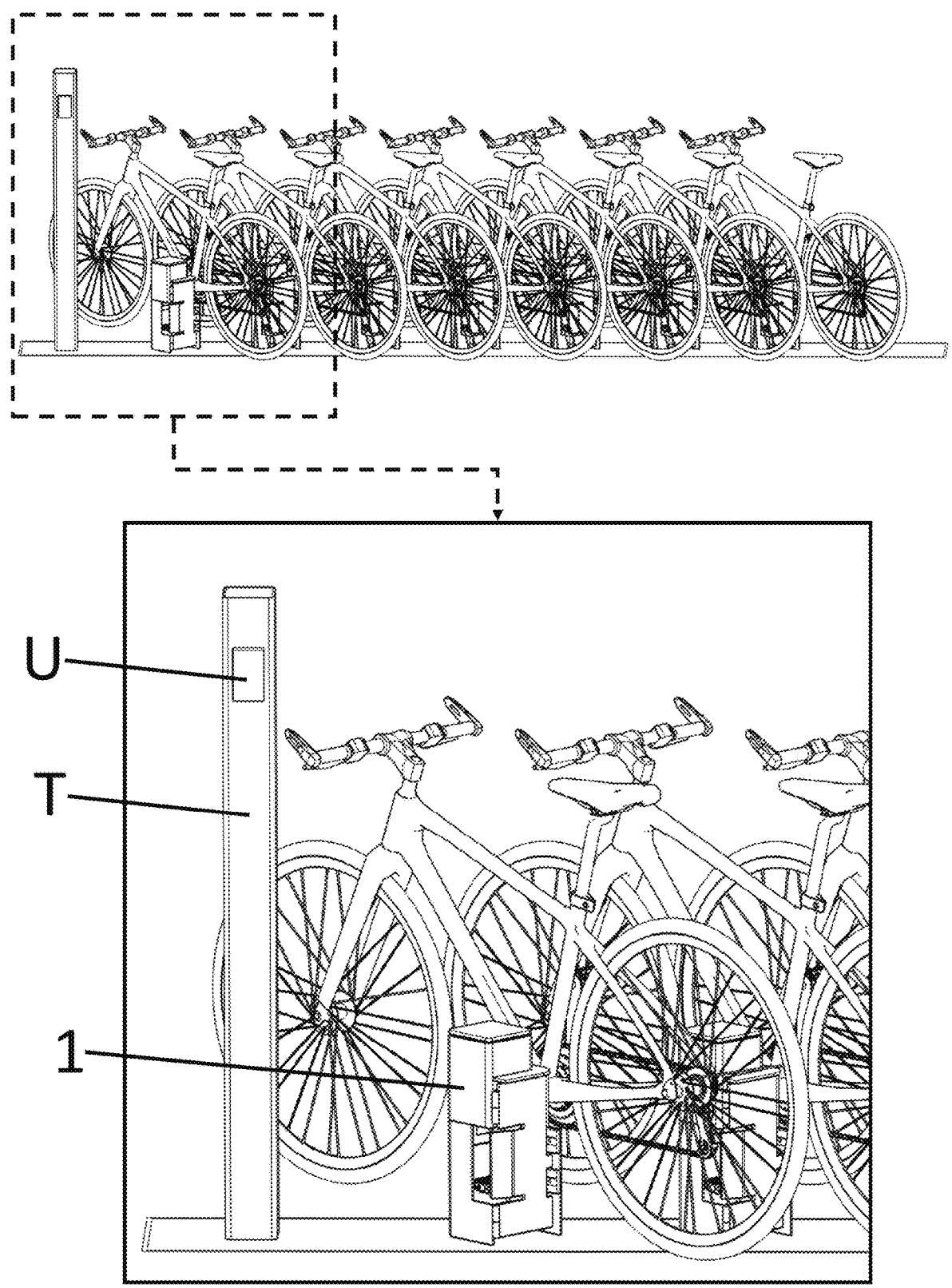
FIG. 18 illustrates 7 pcs. of present invention arranged on a concrete beam to form a parking lot.
Figure 19:
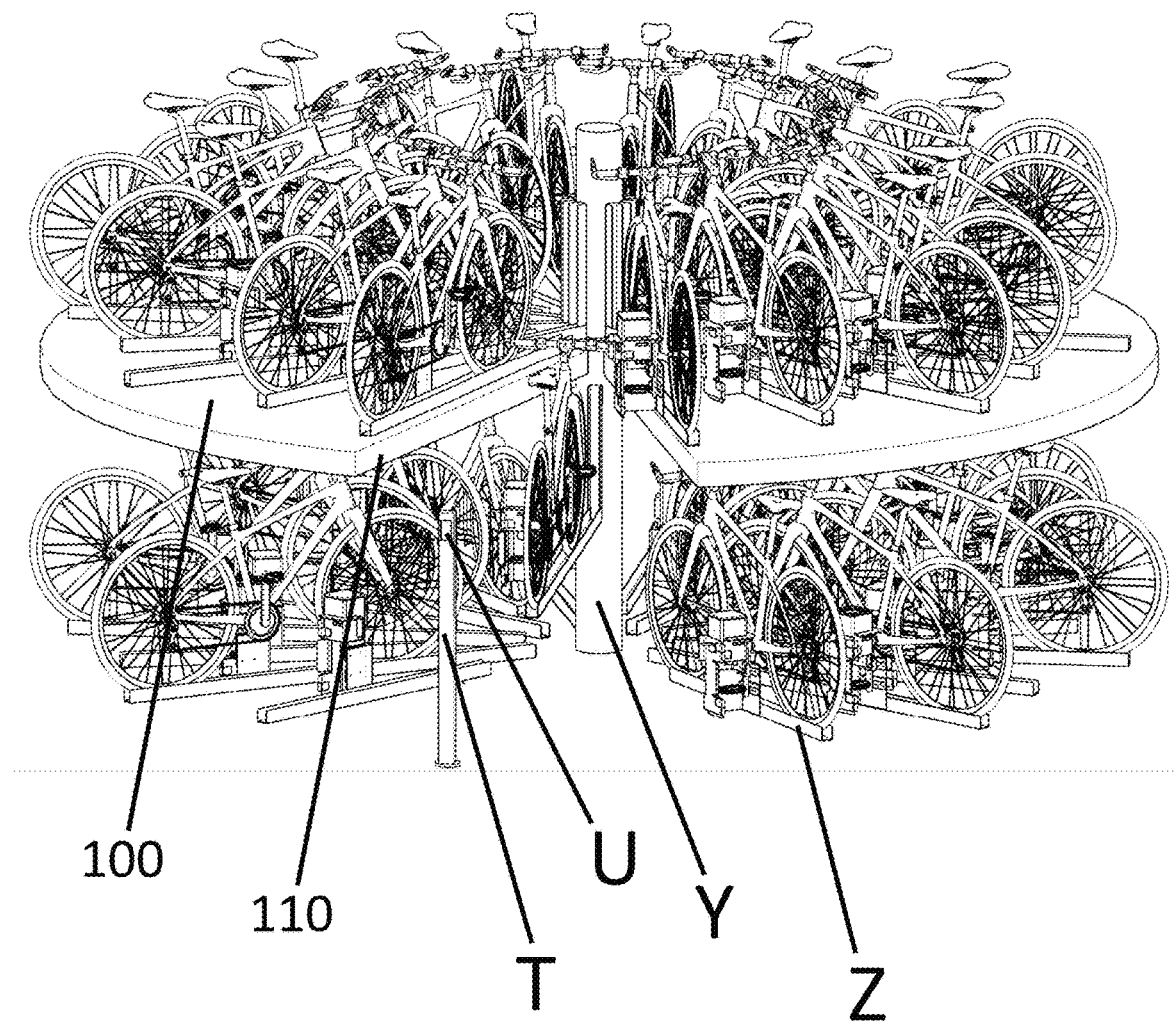
FIG. 19 illustrates present innovation arranged in a carousel parking lot.

FIG. 4 through FIG. 19 illustrates present invention. FIG. 4 through FIG. 10 presents one embodiment and FIG. 11 through FIG. 17 presents another embodiment. FIG. 18 and FIG. 19 illustrates present innovation utilized in parking lot solutions.

Figure 1:
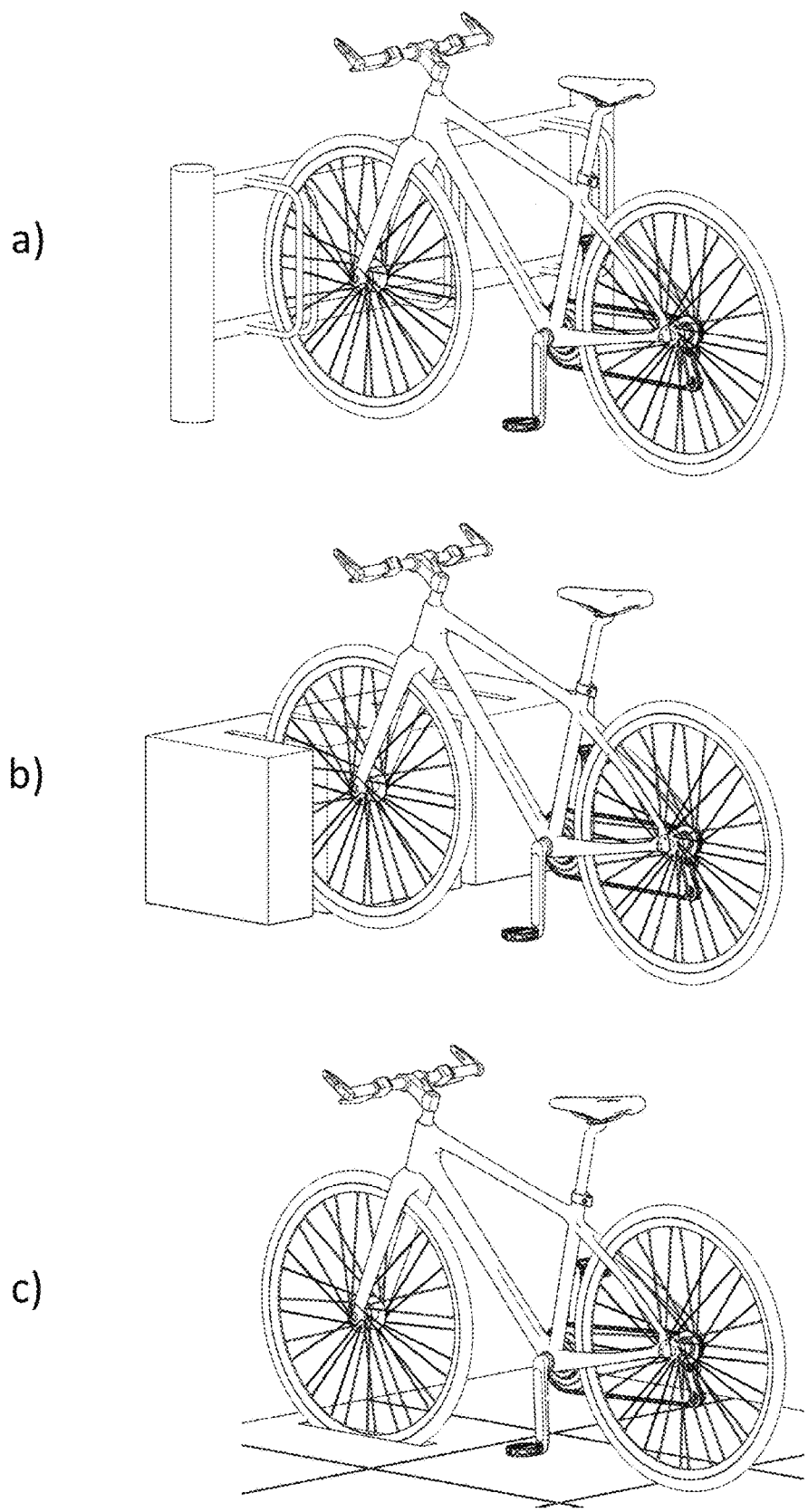
FIG. 1 shows 3 different front wheel support stands according to the prior art. This is the far most common type of bicycle stand.
Figure 2:
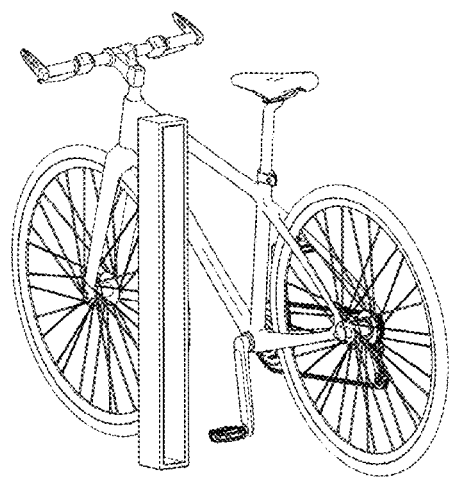
FIG. 2 shows 2 different leaning stands according to the prior art. This is the second most common type of bicycle stand.
Figure 2:
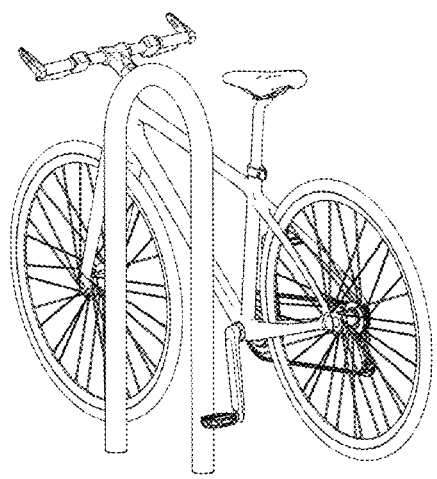
Figure 3:
FIG. 3 shows the bicycle parking stand "Bikeep" by company DesignBoom described in US2015096335. This stand entraps the bicycle with a metal bar around bicycle frame and through the front wheel
Figure 3:
Figure 4:
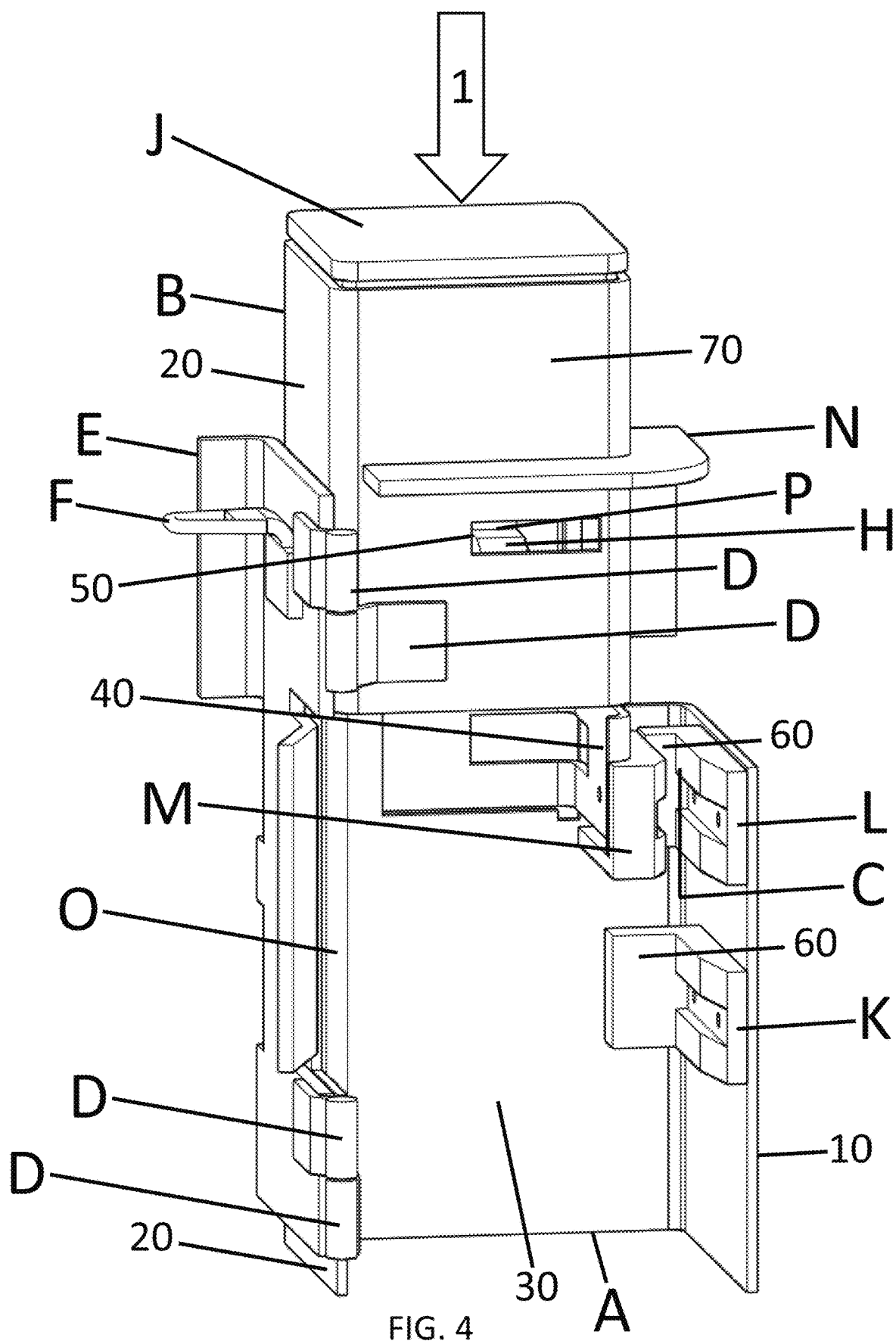
FIG. 4 illustrates one embodiment of present invention in open mode ready for the cyclist to park the bicycle.

FIG. 4 illustrates one embodiment of present invention in open mode ready for a bicycle to be parked. Open mode achieved by gate (E) and comprised striker-plate (F) turned through hinges (D) to a position where gate (E) is parallel to side wall (20) of said bottom section (A). Figure shows vertical side walls (10) and (20) and back wall (30) of bottom section (A) which directly or through a base is affixed to the ground or pavement. Figure also shows fender (L) fixed to the top front corner of side wall (10) and fender (K) also fixed to said side wall (10) but below fender (L).

Figure further shows top section (B) and comprised fender (M) fixed to the flexible section (40) of said top section (B). Flexibility of section (40) and fenders (M) and (L) forms a crankarm-slot (C) for the crankarm (V) to be inserted into. Protrusions (60) on said fenders (L) and (K) forms an end stop for how long crankarm (V) can be inserted. Finally, figure illustrates wire guard (O) protecting the supply cable and guard-plate (N), fixed to and extending over cutout (50) in said top section (B) to protect electronic lock (H) against rain and snow entering through said cutout (50).

Figure 5:
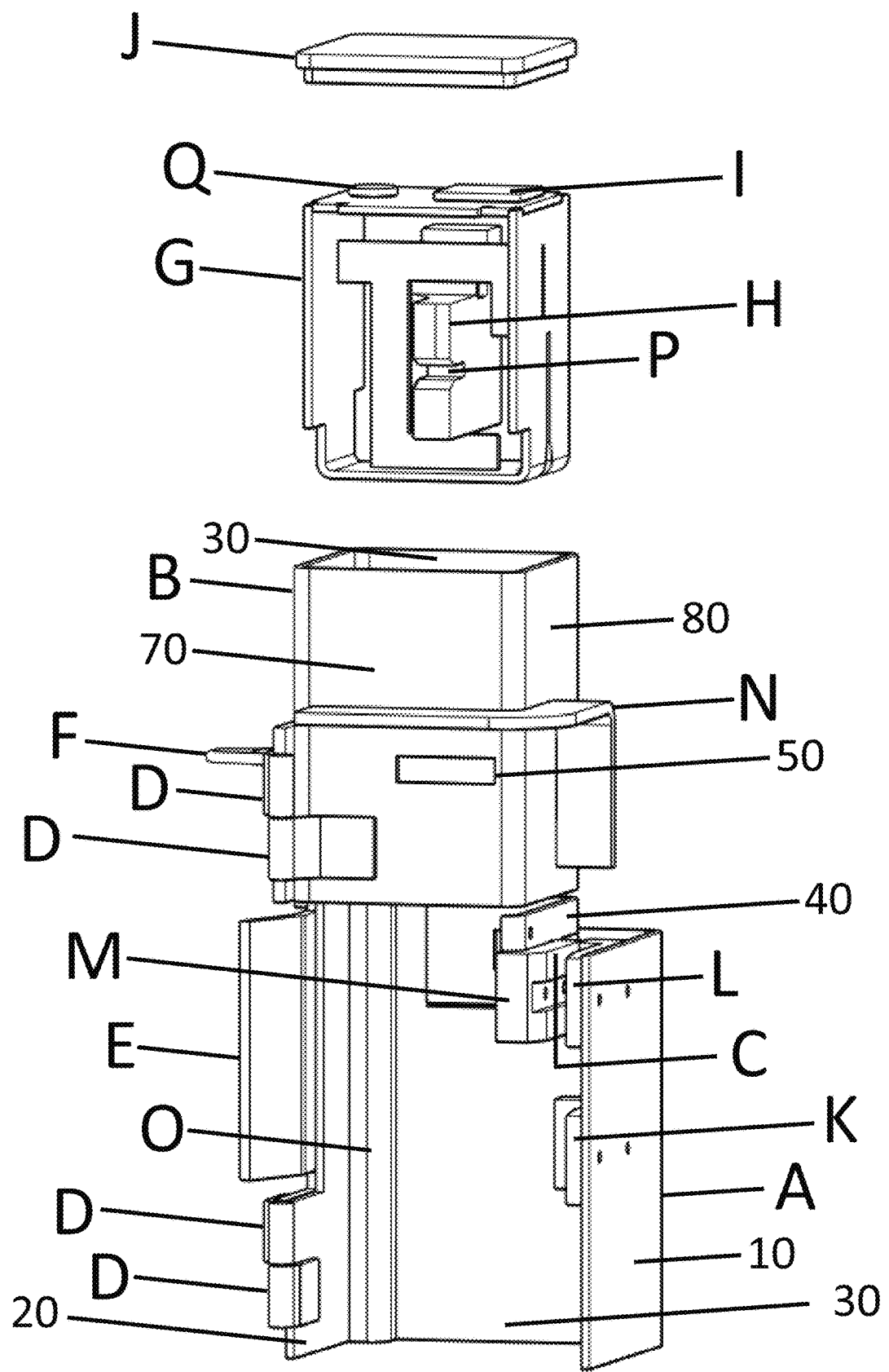
FIG. 5 illustrates same embodiment as in FIG. 4 in open mode with electronic unit (G) pulled out of the top section (B).

FIG. 5 illustrates same embodiment as in FIG. 4 in open mode with the electronic unit (G) and window (J) pulled out of top section (B). Electronic unit (G) comprises an electronic lock (H), a printed circuitry board (I) and LED(s) (Q) situated underneath a window (J) which protects said electronic unit (G) against vandalism and the weather but allows the electronic device to communicate and operate stand (1) through the Near Field Communication (NFC), Bluetooth (BT) or alternative communication standard. Said printed circuitry board (I) contains all electronics for connecting the stand to the internet and to operate the stand including the Near Field Communication (NFC) and Bluetooth (BT) modules communicating with user's electronic device. To operate Stand (1) user must place his or her electronic device above said window (J). Distance which the electronic device can be held above the window (J) depends on the antenna performance of the electronic device. Said LED(s) (Q) indicates through different colors if Stand (1) is locked or open.

Figure further illustrates how electronic lock (H) is fixed in the center area of the electronic unit (G) with the latch slot (P) facing towards the front of the top section so when electronic unit (G) is lowered into the top section (B) said latch (P) is aligned with cutout (50) of top section (B) for striker-plate (F) to come through said opening (50) of front wall (70) and engage with said latch (P) of electronic lock (H). Vertical position of electronic lock (H) is a compromise between strike-plate (F) sitting in a protected position behind gate (E) not immediately accessible with an angle grinder and sitting as close to guard-plate (N) so it offers protection against rain and snow hitting the electronic lock (H) through cutout (50). Horizontal position of electronic lock is so that cutout (50) in top section (B) for striker-plate (F) only extends on the frontside of said top section (B) whereby cutout (50) is fully covered by gate (E) in closed position.

Power for stand (1) is provided externally through a wire. To minimize the need for external power a solar power system can be integrated in the stand (1). A wire-guard (O) welded in the inside corner of wall (20) and (30) of bottom section (A) provides a protected channel from the ground to the electronic unit (G) fixed inside top section (B) for external wires led to the stand (1)

To further strengthen theft protection electronic unit (G) and printed circuitry board (I) can comprise a microphone, a speaker and SW to detect noise from vandalism to the stand (1) and set off an acoustic alarm and send an alarm to facility management if stand (1) is connected to the internet.

Figure 6:
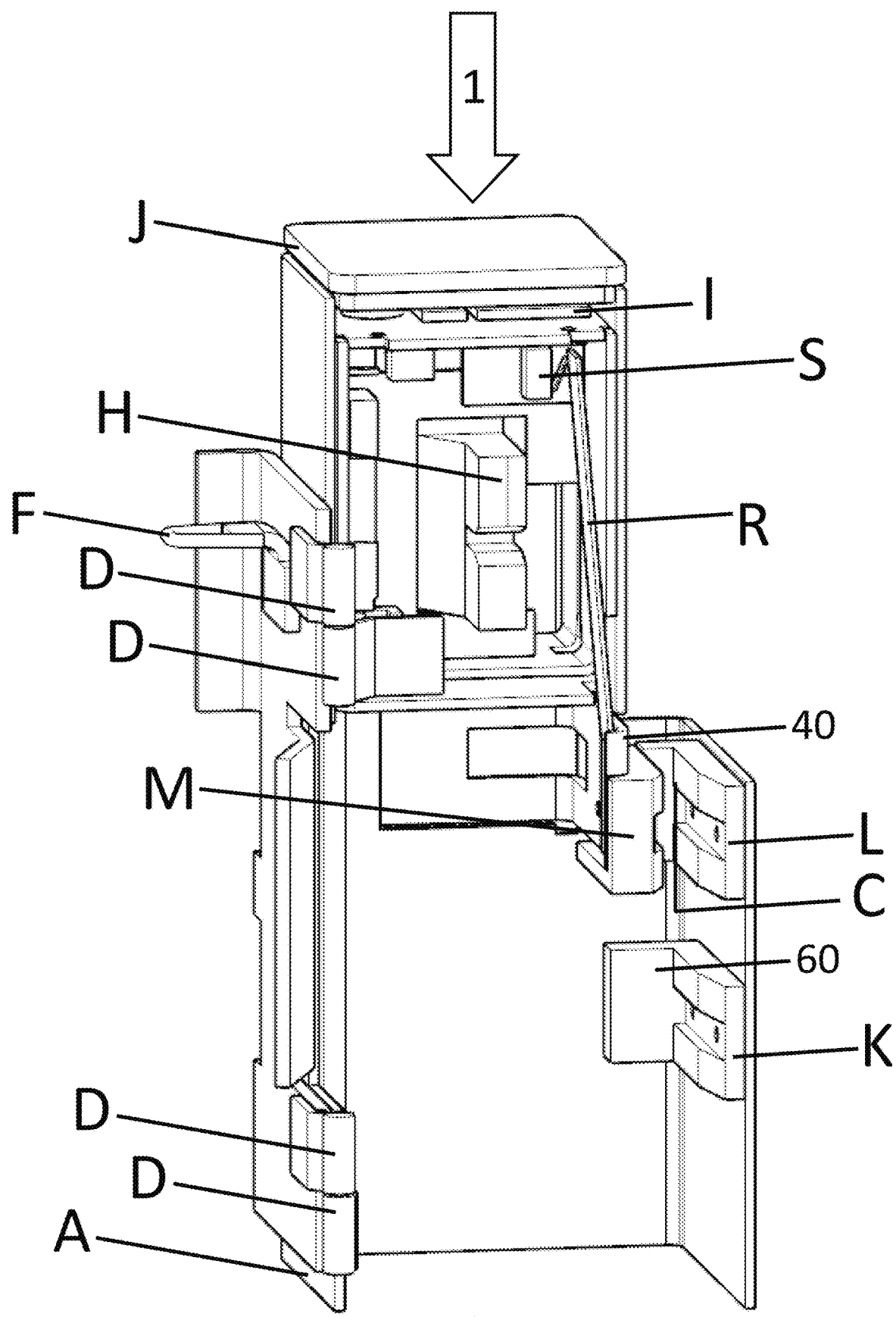
FIG. 6 illustrates same embodiment as in FIG. 4 and FIG. 5 in open mode with front wall of top section (B) and guard-plate (N) removed to show electronic unit (G) inside said top section (B)

FIG. 6 illustrates same embodiment as in FIG. 4 and FIG. 5 in open mode with front wall of top section (B) and guard-plate (N) removed to show electronic unit (G) inside said top section (B). Figure shows how lever (R) attached to flexible section (40) of top section (B) will activate switch (S) when section (40) flexes. Figure further shows how printed circuitry board (I) is situated just below window (J).

Figure 7:
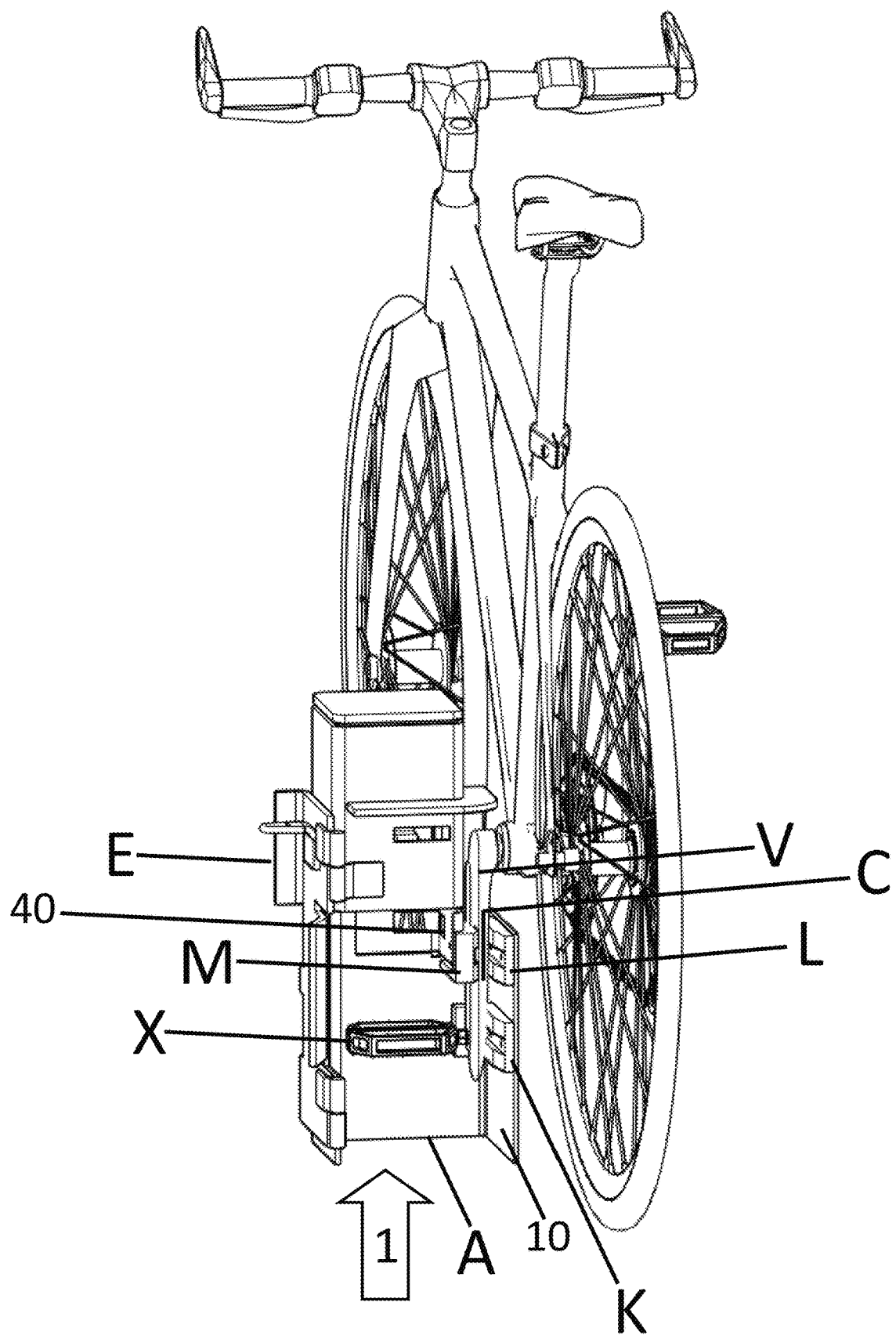
FIG. 7 illustrates same embodiment as in FIG. 4 through FIG. 6 supporting the parked bicycle before closing stand gate (E).

FIG. 7 illustrates same embodiment as in FIG. 4 through FIG. 6 with a parked bicycle before closing stand gate (E). Parking the bicycle requires left crankarm (V) to be around its lowest vertical position, which can easily and conveniently be done with cyclist's foot. Keeping a foot on the pedal (X) when pushing the crankarm (V) into the crankarm-slot (C), makes this an easy and convenient operation. Crankarm (V) is squeezed between fenders (L) and (M) through the flexibility of section (40) keeping the bicycle in an upright position without any additional leaning support, and it as well enables that bicycle can stand on flat ground and doesn't need to be on a forward leaning surface to remain in the crankarm-slot (C).

Figure further shows the fender (K) sitting at the lowest end of the bicycle crankarm (V) on wall (10) of bottom section (A), whereby it ensures that the bicycle cannot tilt towards the stand (1) and get scratched.

Figure 8:
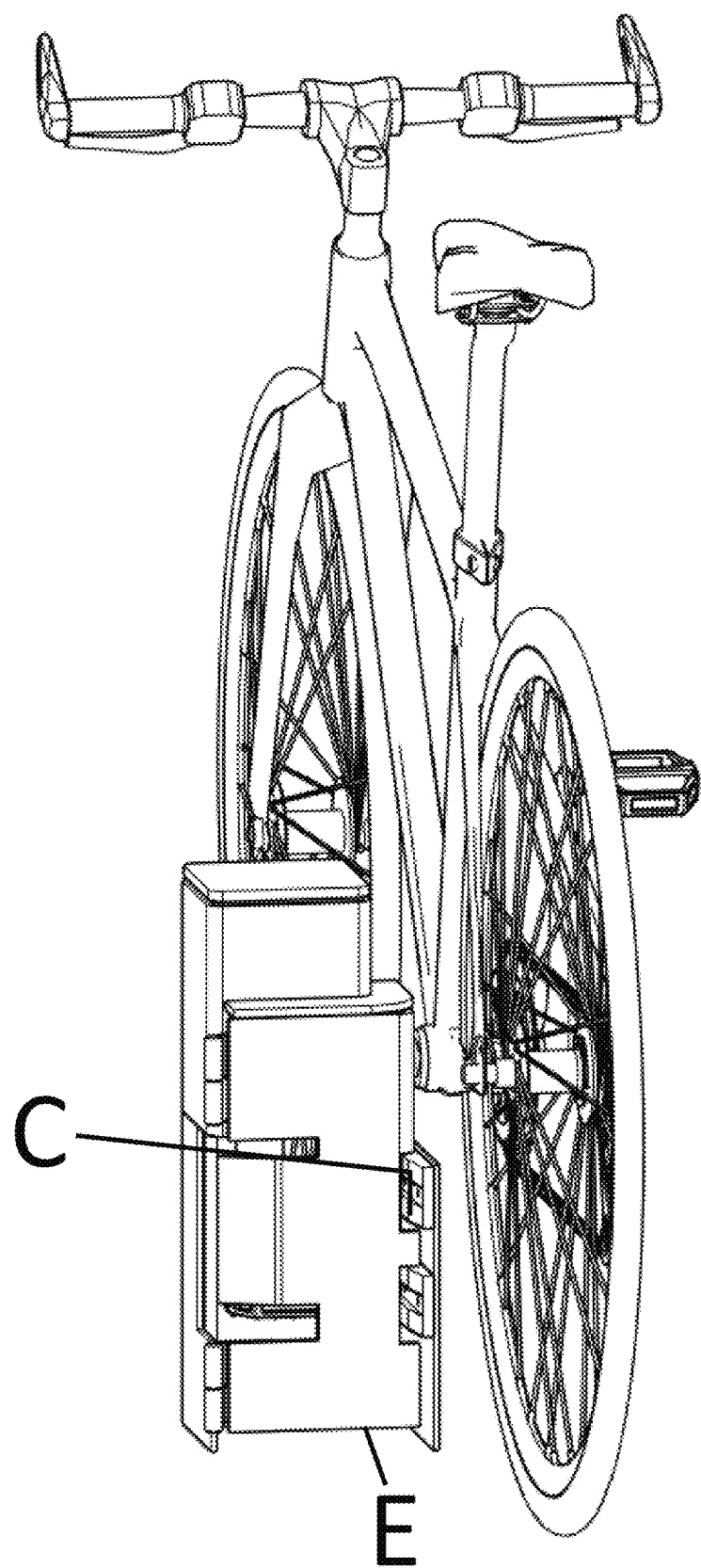
FIG. 8 illustrates same embodiment as in FIG. 4 through FIG. 7 in closed mode and more specific how gate (E) in closed mode blocks crankarm-slot (C)

FIG. 8 illustrates same embodiment as in FIG. 4 through FIG. 7 with stand gate (E) closed and locked whereby it blocks crankarm-slot (C) preventing that the bicycle can be pulled out of the stand.

Figure 9:
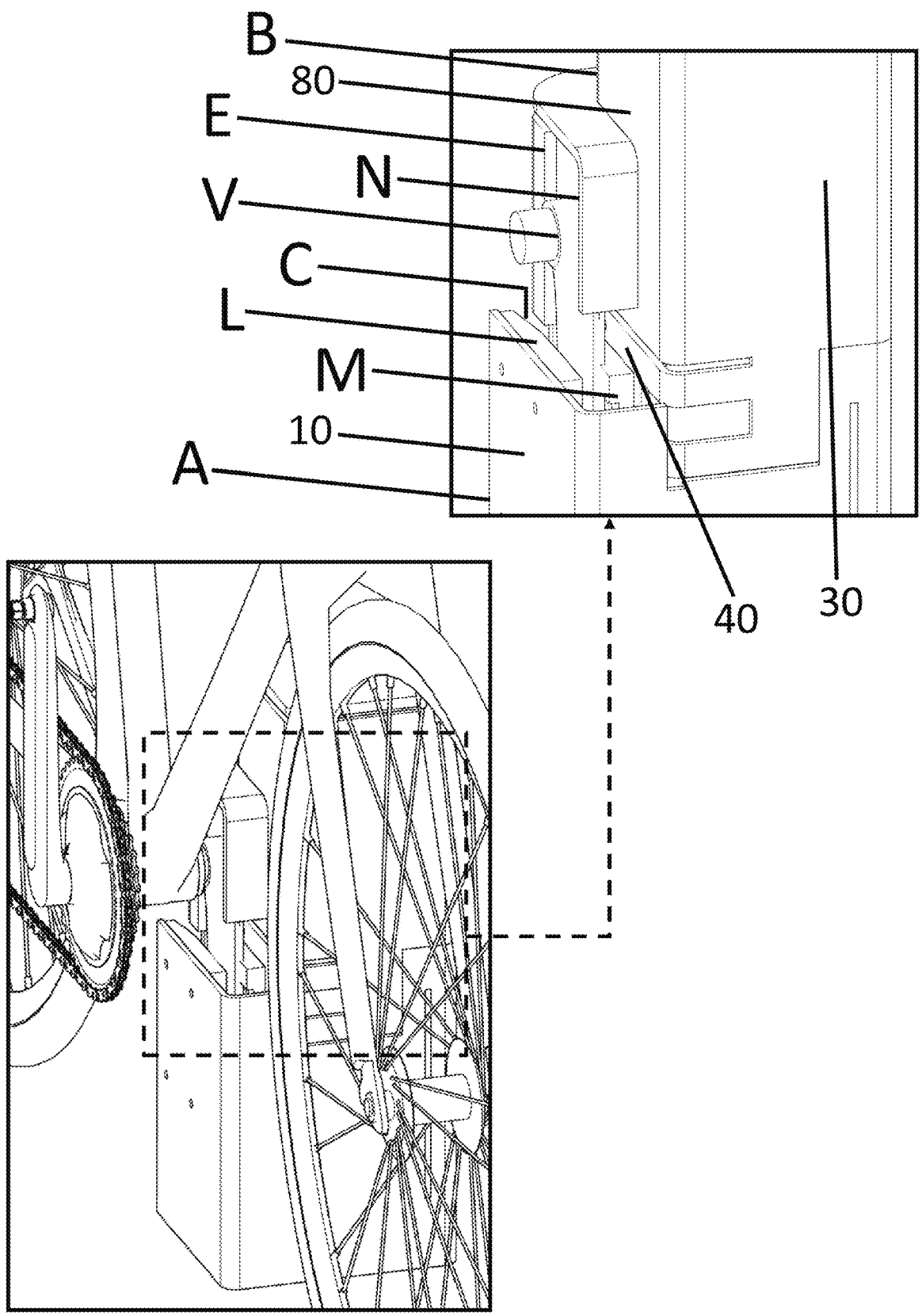
FIG. 9 illustrates same embodiment as in FIG. 4 through FIG. 8 in closed and locked mode and more specific how stand (1) encloses the crankarm (V) preventing it can be dismounted.

FIG. 9 illustrates same embodiment as in FIG. 4 through FIG. 8 and it more specifically illustrates how top section (B), guard-plate (N) and gate (E) in closed mode encloses the top of the bicycle crankarm (V) and prevents access to the screws fixing it to the crank. On the upscaled figure only crankarm (V) is shown to illustrate how gate (E) encloses the far side of the crankarm (V). Figure further illustrates how crankarm-slot (C) comprised of fender (L), fender (M) and flexibility of wall section (40) clamps the bicycle crankarm (V) thereby keeping the bicycle upright without scratching or damaging the bicycle.

Figure 10:
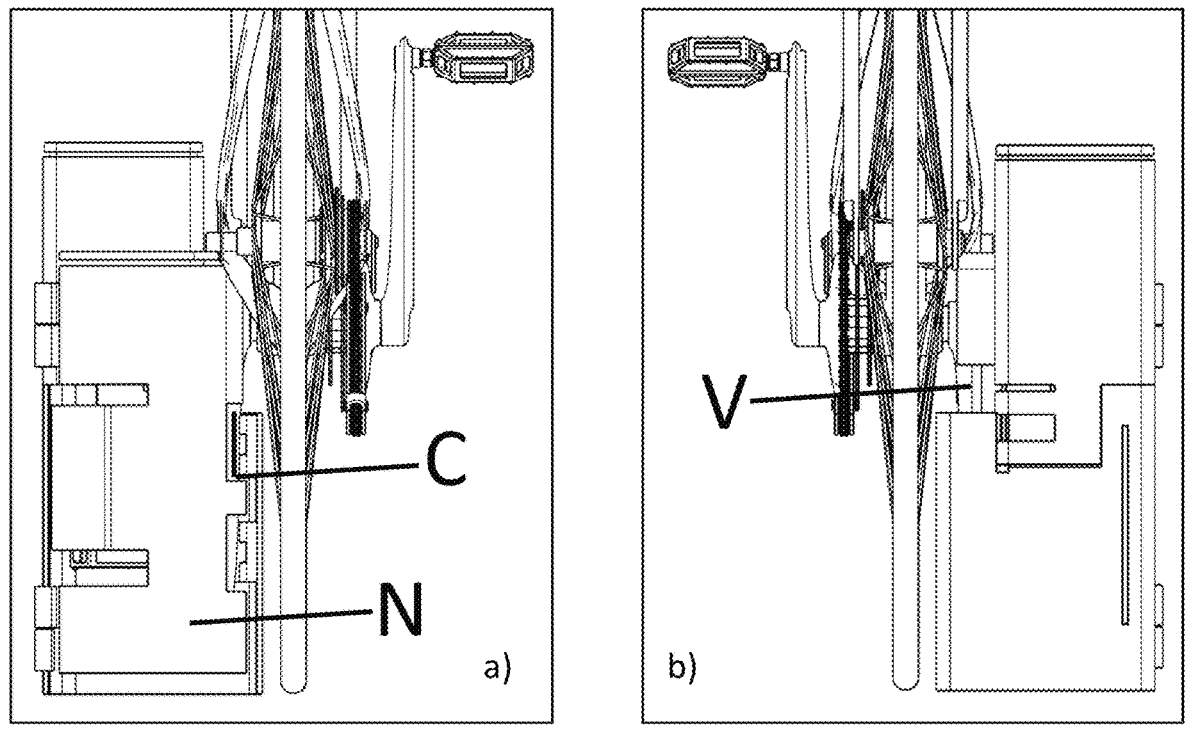
FIG. 10 illustrates same embodiment as in FIG. 4 through FIG. 9 in closed and locked mode and more specific how stand (1) prevent pedal (X) can be accessed and dismounted.
Figure 10:
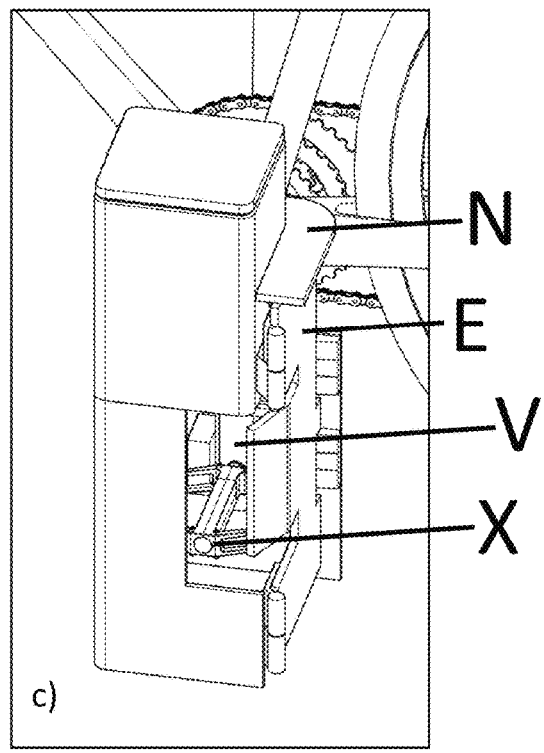

FIG. 10 illustrates same embodiment as in FIG. 4 through FIG. 9 and it has 3 views illustrating how stand (1) in locked mode encloses the bicycle crankarm (V) and pedal (X) thereby preventing that bicycle can be pulled out of stand or bicycle pedal (X) and crankarm (V) immediately accessed with e.g. a wrench or power tool. View a) is a front view illustrating how gate (E) blocks crankarm-slot (C). View b) is a back view illustrating that bicycle crankarm (V) and pedal (X) can't be accessed from this side. View c) is a sideview illustrating limited access to the bolt attaching pedal (X) to the crankarm and further how guard-plate (N) ensures that striker-plate (F) can't be directly accessed with an angle grinder in the vertical plane between top section (B) and gate (E).

Figure 11:
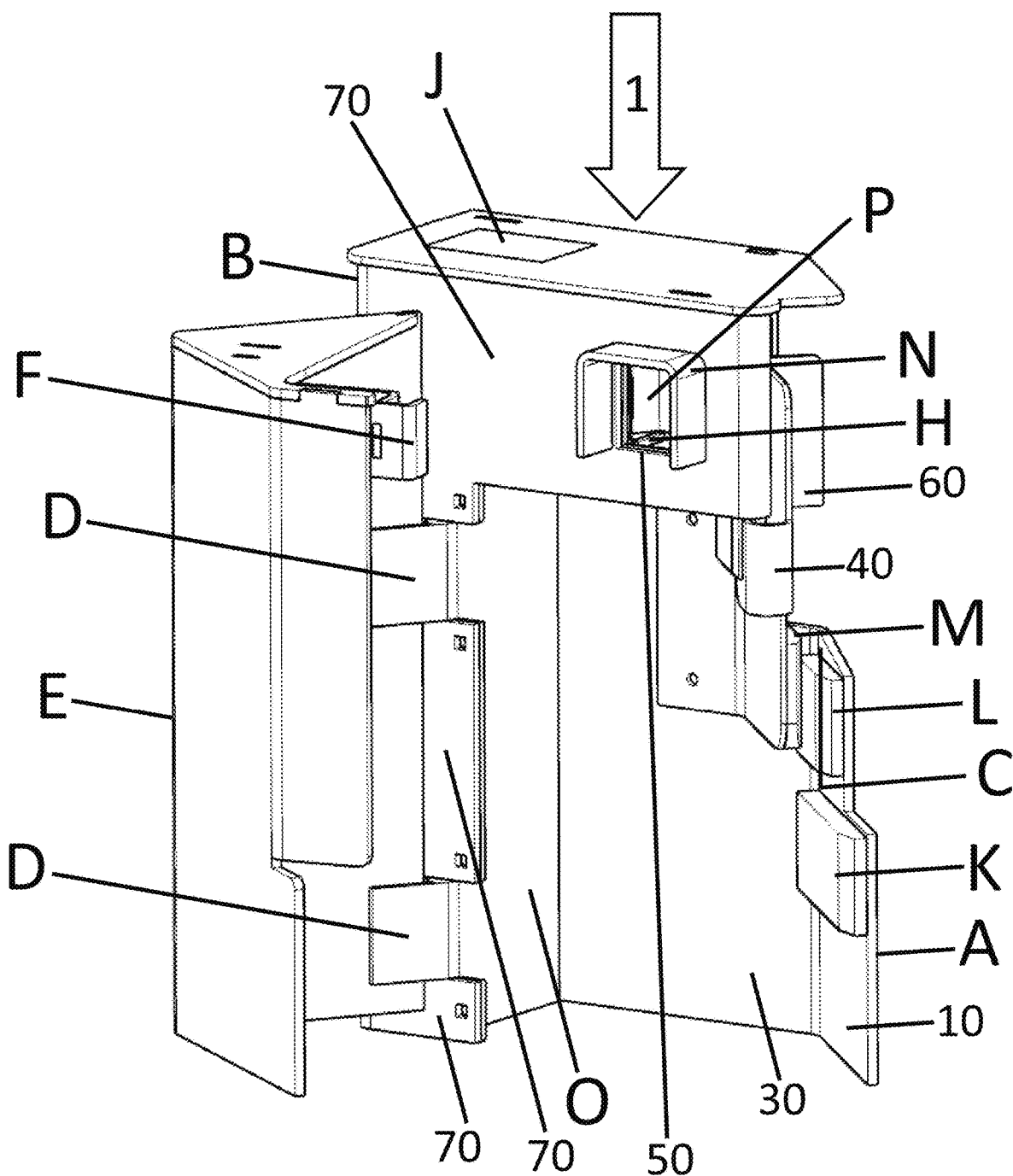
FIG. 11 illustrates another embodiment of present invention in open mode ready for the cyclist to park the bicycle.

FIG. 11 illustrates another embodiment of present invention in open mode ready for a bicycle to be parked. Compared to the embodiment illustrated in FIG. 4 through FIG. 10 this embodiment is characterized by 4 major differences. First major difference being that crankarm-slot (C) is angled 45 degrees relative to front wall (70). Second major difference is the fact that top section (B) is lower but instead wider compared to the embodiment illustrated through FIG. 4 to FIG. 10. These first 2 differences leaves in combination more height and width for the foot of the cyclist when he or she pushes the crankarm into crankarm-slot (C) with their foot on the pedal. Third major difference is that the flexible section (40) of crankarm-slot (C) is a separate part fixed to bottom section (A). Fourth and final major difference is that front wall (70) extends to the ground and is fixation for the hinges (D).

Open mode as illustrated is achieved by gate (E) and comprised striker-plate (F) turned through hinges (D) to a position where gate (E) doesn't block crankarm-slot (C). Figure shows vertical side walls (10) and back wall (30) of bottom section (A) which directly or through a base is affixed to the ground or pavement. Figure also shows fender (L) fixed to the top front corner of side wall (10) and fender (K) also fixed to said side wall (10) but below fender (L). Figure further shows top section (B) and comprised fender (M) fixed to the flexible section (40) which itself is fixed to bottom section (A). Flexibility of section (40) and fenders (M) and (L) forms a crankarm-slot (C) for the crankarm (V) to be inserted into. Protrusion (60) on flexible section (40) forms an end stop for how long crankarm (V) can be inserted. Figure further illustrates wire guard (O) which in combination with side wall (20) not visible on this figure, creates an enclosure protecting the supply cable. Finally, figure illustrates guard-plate (N), fixed to and extending over cutout (50) in said top section (B) to protect electronic lock (H) against rain and snow entering through said cutout (50).

Figure 12:
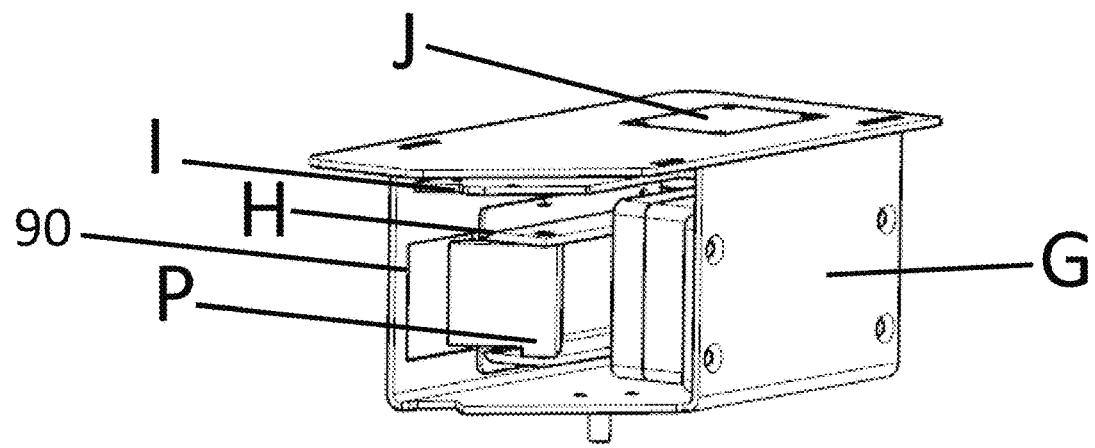
FIG. 12 illustrates same embodiment as in FIG. 11 in open mode with electronic unit (G) pulled out of the top section (B).
Figure 12:
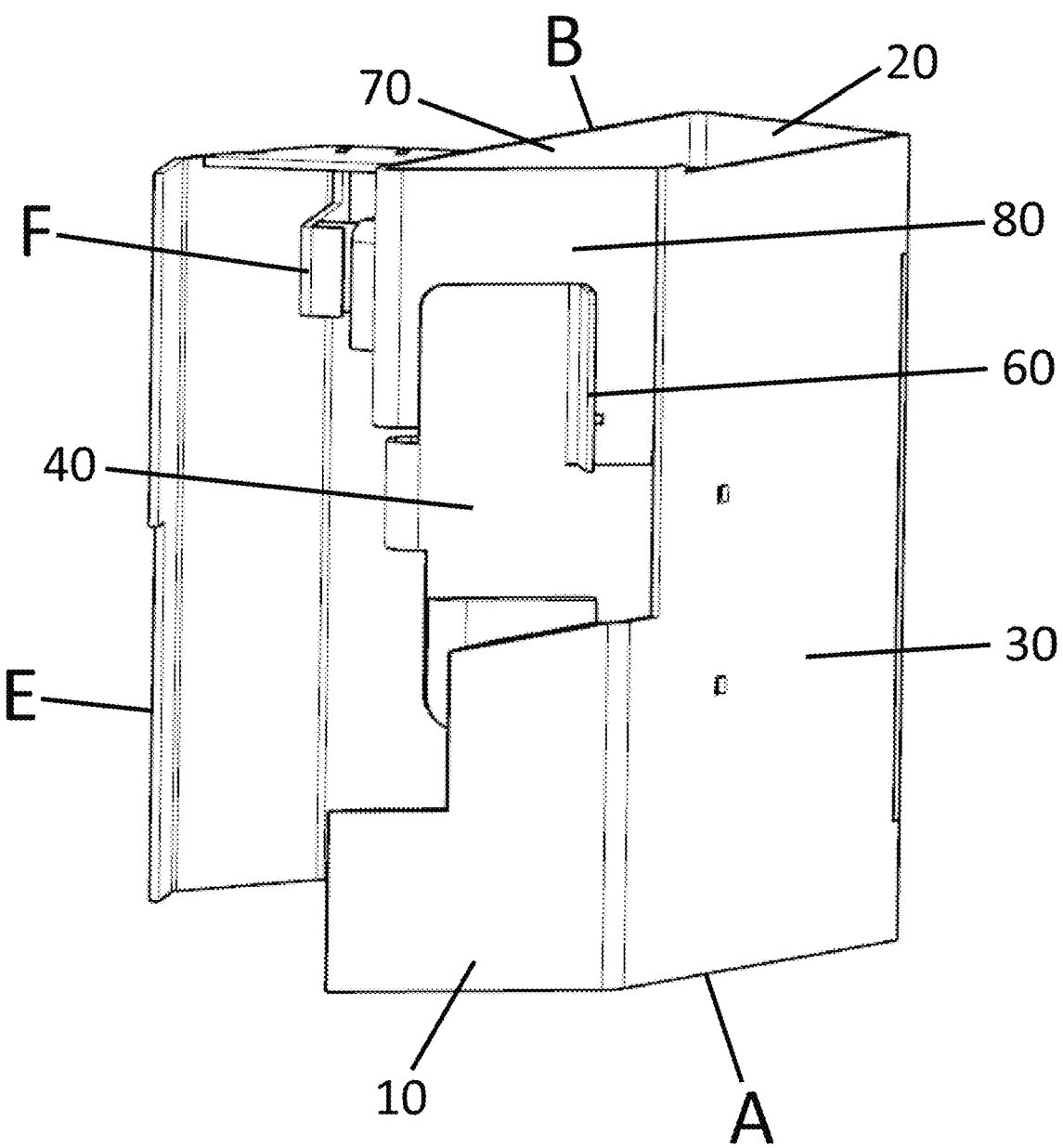

FIG. 12 illustrates same embodiment as in FIG. 11 in open mode with the electronic unit (G) with comprised window (J) pulled out of top section (B). Electronic unit (G) comprises an electronic lock (H), a printed circuitry board (I) situated underneath said window (J) which protects said electronic unit (G) against vandalism and the weather but allows the electronic device to communicate and operate stand (1) through the Near Field Communication (NFC), Bluetooth (BT) or alternative communication standard. Said printed circuitry board (I) contains all electronics for connecting the stand to the internet and to operate the stand including the Near Field Communication (NFC) and Bluetooth (BT) modules communicating with user's electronic device. To operate Stand (1) user must place his or her electronic device above said window (J). Distance which the electronic device can be held above the window (J) depends on the antenna performance of the electronic device.

To further strengthen theft protection electronic unit (G) and printed circuitry board (I) can comprise a microphone, a speaker and SW to detect noise from vandalism to the stand (1) and set off an acoustic alarm and send an alarm to facility management if stand (1) is connected to the internet.

Figure further illustrates how electronic lock (H) with comprised latch (P) is fixed to the electronic unit (G) with the latch (P) accessible through cutout (90) in the frontside of the electronic unit (G). Electronic lock (H) aligned so that striker-plate (F) of gate (E) engage with said latch (P) of electronic lock (H) when said electronic unit (G) is lowered into position in top section (B) and gate (E) is closed.

Figure 13:
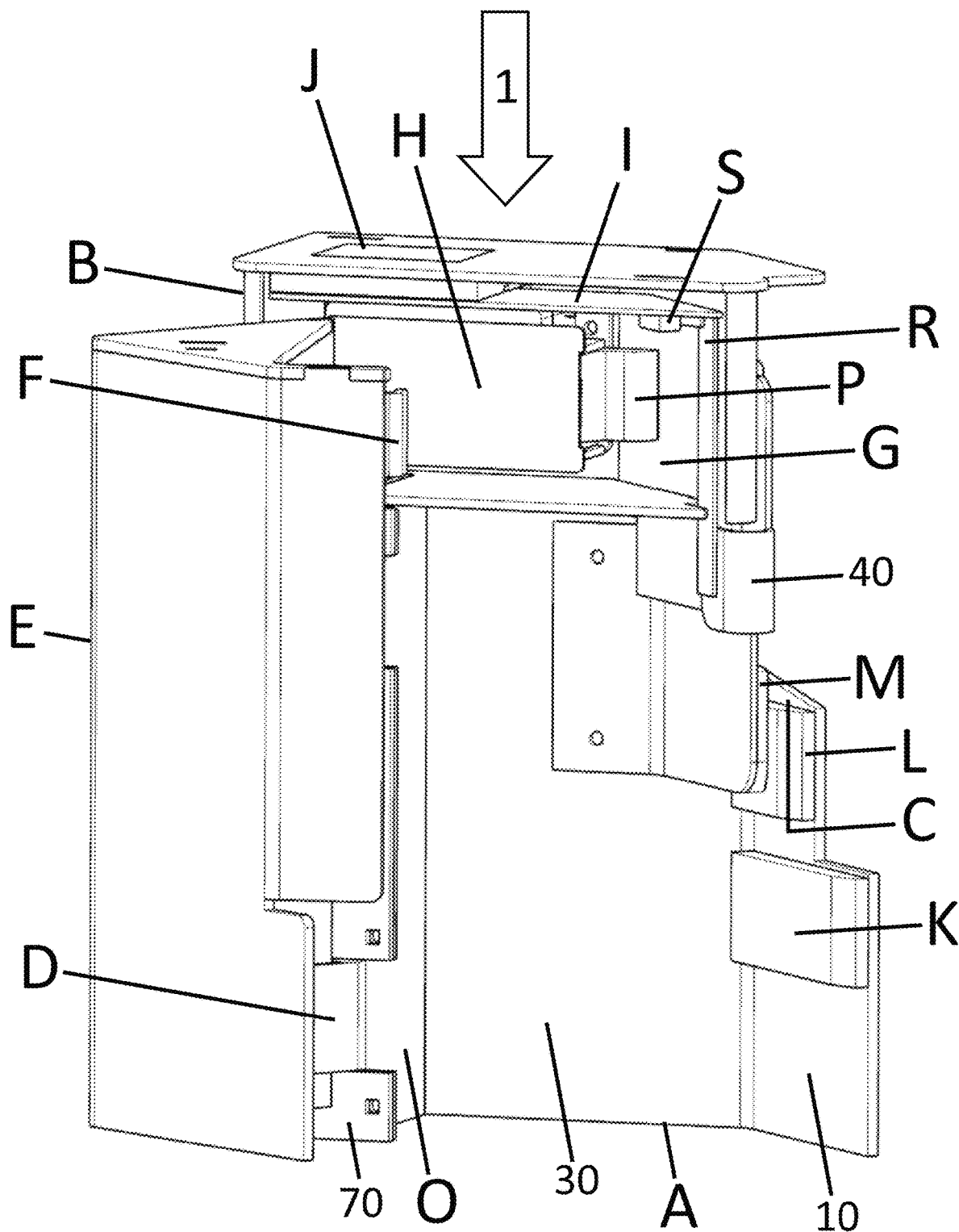
FIG. 13 illustrates same embodiment as in FIG. 11 and FIG. 12 in open mode with front wall of top section (B) removed to show electronic unit (G) inside said top section (B)

FIG. 13 illustrates same embodiment as in FIG. 11 and FIG. 12 in open mode with front wall of top section (B) and electronic unit (G) removed to show said electronic unit (G) positioned inside said top section (B). Figure shows how lever (R) attached to flexible section (40) of top section (B) will activate switch (S) when section (40) flexes. Figure further shows how printed circuitry board (I) is situated just below window (J).

Figure 14:
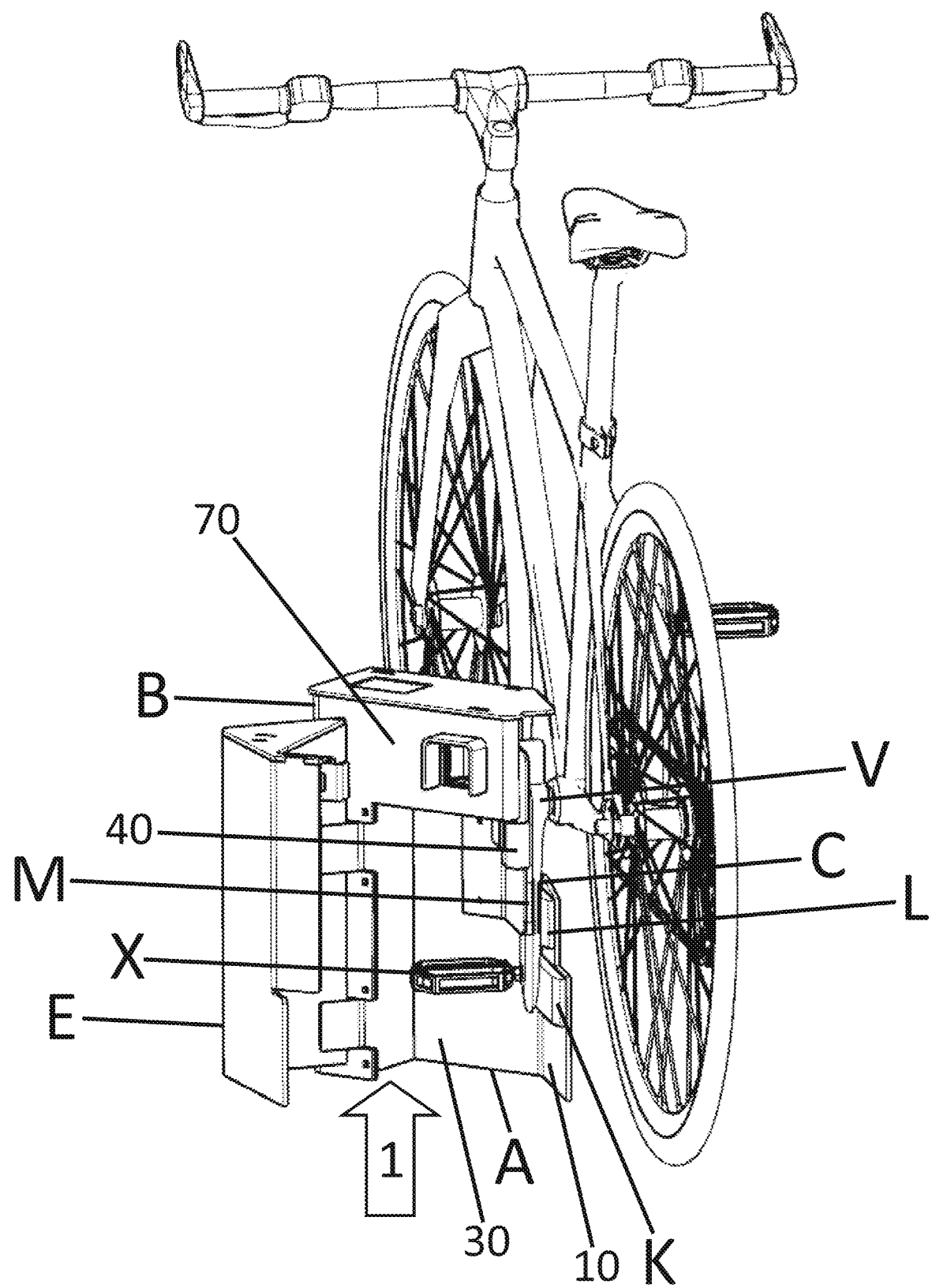
FIG. 14 illustrates same embodiment as in FIG. 11 through FIG. 13 supporting the parked bicycle before closing stand gate (E).

FIG. 14 illustrates same embodiment as in FIG. 11 through FIG. 13 with a parked bicycle before closing stand gate (E). Parking the bicycle requires left crankarm (V) to be around its lowest vertical position, which can easily and conveniently be done with cyclist's foot. Keeping a foot on the pedal (X) when pushing the crankarm (V) into the crankarm-slot (C), makes this an easy and convenient operation. Crankarm (V) is squeezed between fenders (L) and (M) through the flexibility of section (40) keeping the bicycle in an upright position without any additional leaning support, and it as well enables that bicycle can stand on flat ground and doesn't need to be on a forward leaning surface to remain in the crankarm-slot (C).

Figure further shows the fender (K) sitting at the lowest end of the bicycle crankarm (V) on wall (10) of bottom section (A), whereby it ensures that the bicycle cannot tilt towards the stand (1) and get scratched.

Figure 15:
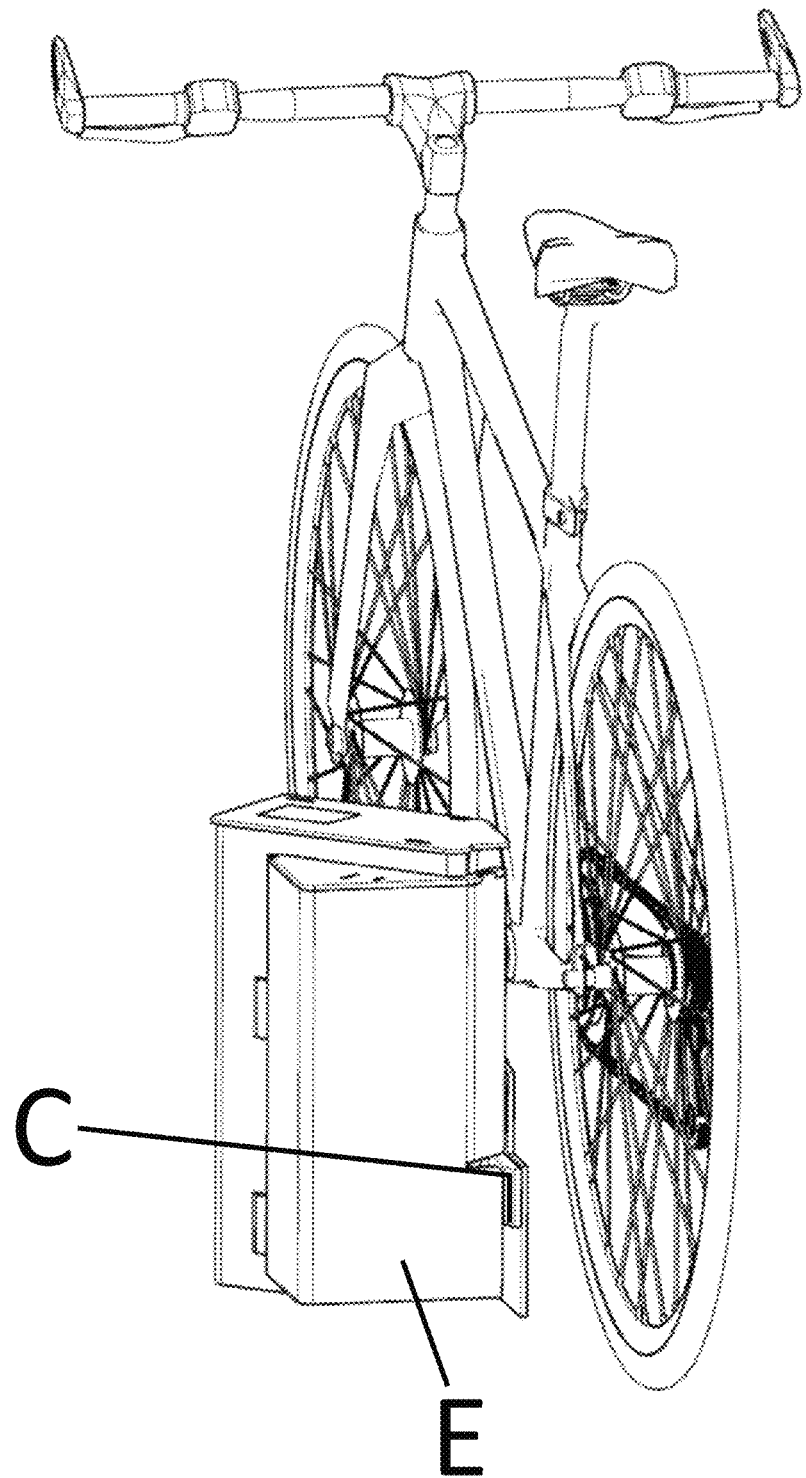
FIG. 15 illustrates same embodiment as in FIG. 11 through FIG. 14 in closed mode and more specific how gate (E) in closed mode blocks crankarm-slot (C)

FIG. 15 illustrates same embodiment as in FIG. 11 through FIG. 14 with stand gate (E) closed and locked whereby it blocks crankarm-slot (C) preventing that the bicycle can be pulled out of the stand.

Figure 16:
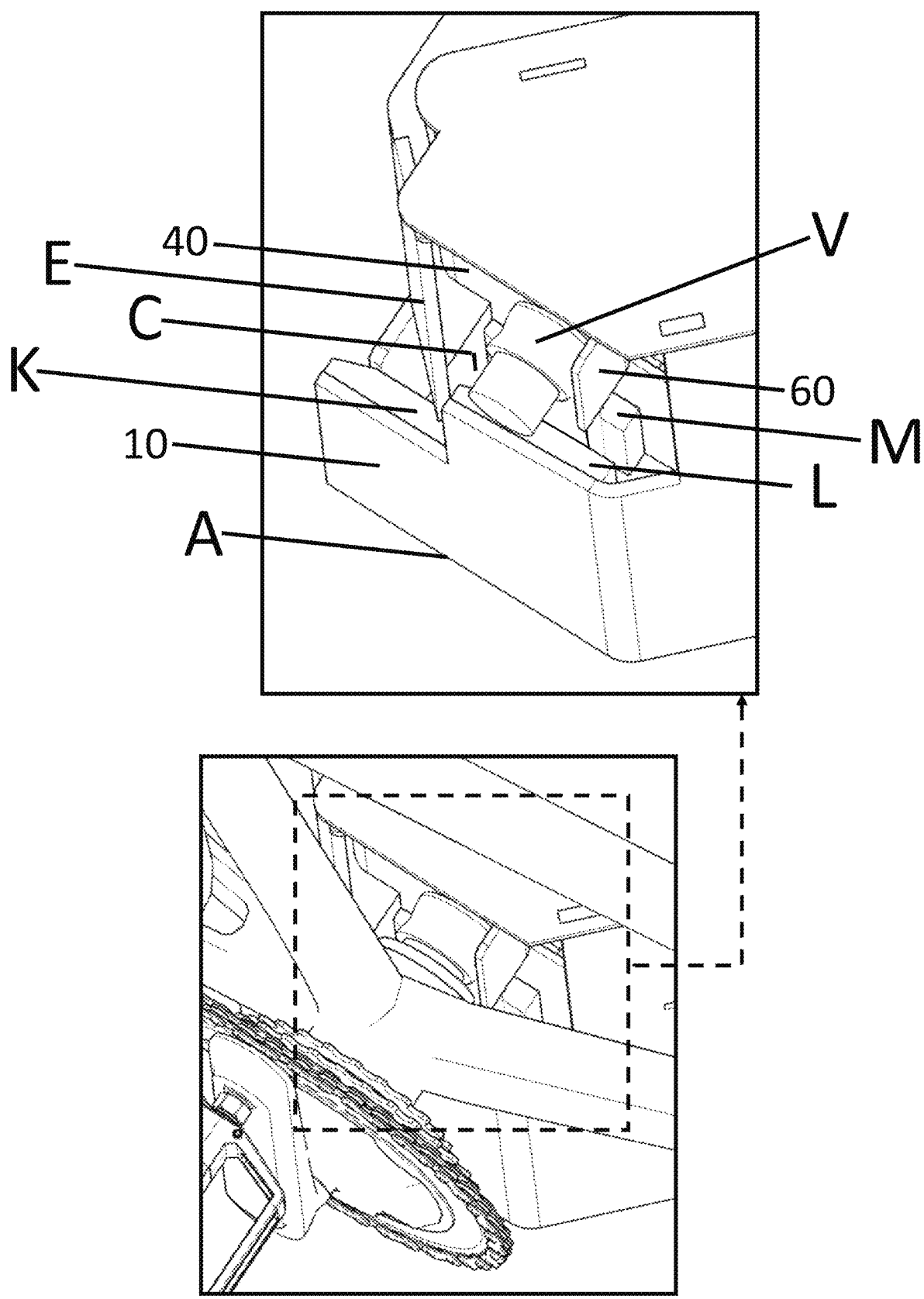
FIG. 16 illustrates same embodiment as in FIG. 11 through FIG. 15 in closed and locked mode and more specific how stand (1) encloses the crankarm (V) preventing it can be dismounted.

FIG. 16 illustrates same embodiment as in FIG. 11 through FIG. 15 and it more specifically illustrates how flexible section (40) with comprised protrusion (60) and gate (E) in closed mode encloses the top of the bicycle crankarm (V) and prevents access to the screws fixing it to the crank. On the upscaled figure only crankarm (V) is shown to illustrate how gate (E) encloses the far side of the crankarm (V). Figure further illustrates how crankarm-slot (C) comprised of fender (L), fender (M) and flexibility of wall section (40) clamps the bicycle crankarm (V) thereby keeping the bicycle upright without scratching or damaging the bicycle.

Figure 17:
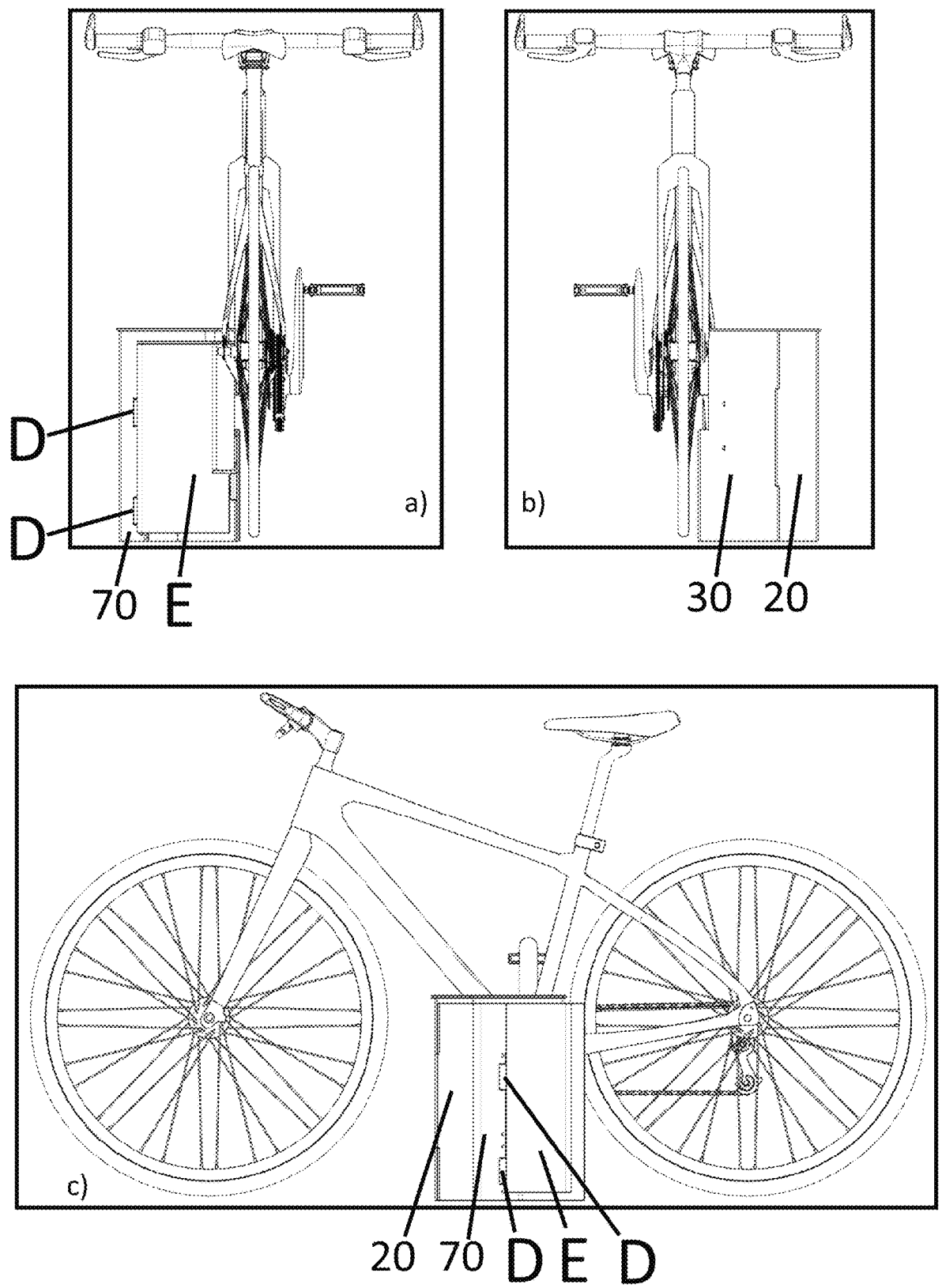
FIG. 17 illustrates same embodiment as in FIG. 11 through FIG. 16 in closed and locked mode and more specific how stand (1) prevent pedal (X) can be accessed and dismounted.

FIG. 17 illustrates same embodiment as in FIG. 11 through FIG. 16 and it has 3 views illustrating how stand (1) in locked mode encloses the bicycle crankarm (V) and pedal (X) thereby preventing that bicycle can be pulled out of stand or bicycle pedal (X) and crankarm (V) immediately accessed with e.g. a wrench or power tool. View a) is a front view illustrating how gate (E) blocks crankarm-slot (C). View b) is a back view illustrating that bicycle crankarm (V) and pedal (X) can't be accessed from this side. View c) is a sideview illustrating no access to the bolt attaching pedal (X) to crankarm (V).

FIG. 18 illustrates 7 pcs. of present invention arranged on a concrete beam to form a parking lot. Figure further illustrates a pole (T) with a comprised electronic box (U) comprising a window and printed circuitry board and intertied antenna for user to register his or her electronic device at the pole and not at the individual stand. By having one remote pole (T) at which all stands must be operated, electronics and thereby cost of the overall parking station can be cut compared to having printed circuitry boards with intertied antennas for communicating with user electronic device in each stand.

FIG. 19 illustrates present invention arranged in a circular parking lot. Stands are in this embodiment arranged in a lower and upper circle separated by a fixed deck (100) with a cutout (110). Stands in the lower circle are fixed to the ground whereas stands in the upper circle can rotate unlimited around the center pole (Y) as a carousel. The 2 stand positions in the lower circle below said cutout (110) in deck (100) is left empty, and the resulting open area is instead used for the stands from the upper carousel that is lowered and lifted by a lift system in the center pole (Y). In order to lift and lower the bicycles each stand does in this embodiment contain a wheel track (Z) extending the full length of the bike.

Users must register at the electronic box (U) fixed on the pole (T). Said electronic box (U) comprising a window and a printed circuitry board with an intertied antenna for communication with user electronic device.

A user who wishes to park their bicycle in the upper circle must as the first action register their electronic device at the electronic box (U). If there is an available stand on the upper circle the upper circle will rotate the available stand to the position above the open space in the lower circle and lower the stand to the ground. User then inserts the bicycle and upon closing the gate stand with inserted bicycle is lifted back to the upper circle.

A user who must collect a bicycle from a stand in the upper circle must register their electronic device at the electronic box (U) and this initiates a 3-step process. First step is that the upper circle rotates to bring the required stand with inserted cycle in the position above said cutout (110) of deck (100) and the open space in the lower circle. Second step is that stand with bicycle is lowered to the ground. Third and final action is that the gate of the stand opens whereby user can remove the bicycle from the stand.

Stands in the lower circle can either be prepared for user registration at the individual stand or at the electronic box (U) on pole (T) as the embodiment illustrated in FIG. 18.

The invention claimed is:

1. A bicycle parking stand (1) for locking a bicycle to the stand (1) comprising:
    a bottom section (A) directly or through a base affixed to the ground or pavement, said bottom section (A) comprises a right vertical side wall (10), an opposite placed vertical left side wall (20) and a back-wall (30), characterized in the bicycle parking stand (1) further comprising a top section (B) fixed on top of said bottom section (A), said top section (B) comprising the vertical left side wall (20), the back wall (30), a right vertical wall (80) and a front wall (70),
    the stand (1) further comprises a gate (E) hinged to the joined bottom section (A) and top section (B) by hinges (D), and
    an electronic unit (G) fixed inside the top section (B), said electronic unit (G) comprises an electronic lock (H) with a latch (P) and a printed circuitry board (I) containing electronics,
    the stand (1) further comprises clamping means for releasable clamping a crankarm (V) of the bicycle to said clamping means, and the gate (E) is adapted to move from an open position to a closed position and a striker plate (F) placed on the gate (E) engages the latch (P) of the electronic lock (H) thereby preventing said gate (E) from opening and the bicycle being pulled out of the clamping means when the electronic lock (H) is activated.

2. A bicycle parking stand (1) according to claim 1 wherein the top section (B) further comprises a window (J), and that the locking/unlocking of the bicycle is adapted to take place by placing an electronic device above the window (J) whereby the electronic device communicates with the printed circuit board (I) whereby the locking/unlocking takes place.

3. A bicycle parking stand (1) according to claim 1 wherein the clamping means comprises a fender (M) integrated with a wall section (40) attached to the top section (B) or to the bottom section (A) and being horizontally flexible, said fender (M) forms together with a second fender (L) placed at the inside of one side wall (10,20) situated across of it, the clamping means being a flexible crankarm-slot (C), and the bicycle crankarm (V) is adapted to be pushed into said crankarm-slot (C) causing a clamping force upon crankarm (V) keeping the bicycle in upright position.

4. A bicycle parking stand (1) according to claim 1, wherein the printed circuitry board (1) is positioned just below a window (J) allowing users electronic device to communicate with wireless communication including either or both of Near Field Communication (NFC) and Bluetooth (BT) modules, of said circuitry board (1).

5. A bicycle parking stand (1) according to claim 3 further comprising a lever (R) attached to the flexible wall section (40) said lever is adapted to activate a switch (S) in the electronic unit (G) when a bicycle is inserted.

6. A bicycle parking stand (1) according to claim 1 wherein the electronic unit further comprises LED(s) (Q) or an acoustic device adapted to indicate locking status of the stand (1) to a user.

7. A bicycle parking stand (1) according to claim 1 wherein the printed circuitry board (I) further comprises a microphone, speaker and an element adapted to detect vandalism and set off an acoustic alarm and/or send an alarm to facility management.

8. A bicycle parking stand (1) according to claim 1 wherein a power unit is integrated in the lock.

9. A bicycle parking stand (1) according to claim 1 wherein a reader (U) situated on a remote pole (T) away from the individual stand (1) is capable of receiving registration data from a user's electronic device.

10. A bicycle parking stand (1) according to claim 1 wherein the striker plate (F) of the gate (E) is adapted to push the latch (P) during locking of the bicycle to the stand (1) whereby the latch (P) is adapted to rotate.

11. A bicycle stand (1) according to claim 1 wherein the bottom section (A) further comprises a fender (M) fixed to a wall below the fender (M) thereby sitting at the lower end of the bicycle crankarm (V) and limiting how much the bicycle can be tilted towards the stand (1).

12. A bicycle stand according to claim 1 wherein the stand (1) is connected to the internet, either wireless or by wire.

13. A bicycle stand (1) according to claim 3 wherein the fenders (M) and second fender (L) comprise protrusions acting as an end stop for the insertion of the bicycle crankarm (V).

14. A bicycle stand (1) according to claim 1 further comprising wherein the stand is capable of transferring data to a remote device.

15. A bicycle stand (1) according to claim 1 wherein the crankarm-slot (C) is open at both front and backside of bottom section (A) with a gate solution blocking both openings.

* * * * *